United States Patent

Bouvet et al.

[11] Patent Number: 6,138,988
[45] Date of Patent: Oct. 31, 2000

[54] BUTTERFLY VALVE FOR REGULATING A FLUID FLOW

[75] Inventors: Thierry Bouvet, Leaz; Franck Bordellier, Confort, both of France

[73] Assignee: M.G.I. Coutier S.A., Champfromier, France

[21] Appl. No.: 09/202,683

[22] PCT Filed: Apr. 16, 1998

[86] PCT No.: PCT/FR98/00766

§ 371 Date: Dec. 18, 1998

§ 102(e) Date: Dec. 18, 1998

[87] PCT Pub. No.: WO98/48204

PCT Pub. Date: Oct. 29, 1998

[30] Foreign Application Priority Data

Apr. 18, 1997 [EP] European Pat. Off. .............. 97104992

[51] Int. Cl.[7] ............................................. F16K 1/226
[52] U.S. Cl. ............................................. 251/306
[58] Field of Search ................................. 251/305, 306, 251/308; 123/337; 29/890.122, 890.126, 890.127; 137/375

[56] References Cited

U.S. PATENT DOCUMENTS

| | | | |
|---|---|---|---|
| 3,770,242 | 11/1973 | O'Connor, Jr. .......................... | 251/305 |
| 4,407,483 | 10/1983 | Gachot ................................... | 251/306 |
| 4,510,965 | 4/1985 | Peroux et al. ........................... | 251/305 |
| 4,774,750 | 10/1988 | Platusich ............................. | 29/890.127 |
| 4,777,977 | 10/1988 | Platusich ................................. | 251/306 |
| 4,786,031 | 11/1988 | Waldrop .................................. | 251/305 |
| 5,029,811 | 7/1991 | Yamamoto et al. .................... | 251/306 |
| 5,374,031 | 12/1994 | Semence et al. ........................ | 251/305 |
| 5,465,696 | 11/1995 | Gmelin ................................... | 251/305 |
| 5,509,441 | 4/1996 | Platusich ................................. | 251/305 |
| 5,538,029 | 7/1996 | Holtgraver ............................... | 251/306 |
| 5,615,861 | 4/1997 | Pollmann et al. ....................... | 251/306 |
| 5,918,857 | 7/1999 | Wattignier et al. ..................... | 251/305 |
| 6,003,490 | 12/1999 | Kihara et al. ........................... | 123/337 |

FOREIGN PATENT DOCUMENTS

| | | |
|---|---|---|
| 0 023 133 B1 | 1/1981 | European Pat. Off. . |
| 0 109 792 A1 | 5/1984 | European Pat. Off. . |
| 0 482 272 A1 | 4/1992 | European Pat. Off. . |
| 2 674 573 | 10/1992 | France . |
| 2 687 601 A1 | 8/1993 | France . |
| 2 694 963 A1 | 2/1994 | France . |
| 196 15 438 A1 | 1/1997 | Germany . |
| 96/07041 | 3/1996 | WIPO . |

*Primary Examiner*—Kevin Shaver
*Assistant Examiner*—Eric Keasel
*Attorney, Agent, or Firm*—Davis and Bujold

[57] ABSTRACT

The invention concerns a butterfly valve for regulating a fluid flow rate in particular the air flow rate of an air distributor in an internal combustion engine fuel injector, and the method for making the valve. The valve (1) comprises a housing (2) traversed by a conduit (3) circulating the fluid wherein is provided a butterfly induction shutter (4) mounted on a control axis (5) perpendicular to the conduit axis. The invention is characterized in that it comprises a ring (6) co-axial with the conduit and set between the housing (2) and the induction shutter (4), the ring (6) being made of a material with good dimensional stability and the housing being molded around the ring in a material resistant to the imposed technical constraints and the ring (6) is so arranged that, when the shutter is in closed position, there still is a predetermined clearance between the ring (6) active inner surface (13) and the induction shutter (4) arranged to allow a minimal and time-constant fluid flow rate whatever the variations in humidity or temperature. The invention is applicable to internal combustion engine and any device requiring fluid flow rate regulation.

20 Claims, 4 Drawing Sheets

BUTTERFLY VALVE FOR REGULATING A FLUID FLOW

The present invention relates to a butterfly valve for controlling the flow of a fluid, in particular the air flow rate entering an air distributor provided in a fuel injection device for an internal combustion engine, this valve comprising a housing made of a molded synthetic material in which is arranged a conduit for the fluid to circulate, and a butterfly shutter located at right angles to the conduit and mounted on a control shaft guided in the housing, the shutter being designed to move between a position in which the conduit is closed and the butterfly shutter is oriented substantially perpendicular to said conduit's shaft and a position in which the conduit is fully open and the butterfly shutter is oriented substantially parallel to said conduit's shaft. The invention also relates to the methods for manufacturing this butterfly valve.

BACKGROUND OF THE INVENTION

Butterfly valves are well known and commonly used in the automotive industry. These butterfly valves are usually designed to control the air intake in an air distributor for a fuel injection device using a more or less open butterfly shutter. When the engine idles, this valve has to allow just the right minimum amount of air to pass to ensure that the engines runs. During an acceleration phase, when the driver of a vehicle presses on the accelerator pedal, the butterfly valve has to make it possible to increase the amount of air by instantaneously opening the shutter. In order to ensure flexibility during an acceleration phase, some butterfly valves are designed to allow air to pass through progressively when the butterfly shutter opens. For this purpose, the active inner surface of the valve's housing, i.e. the surface which co-operates with the shutter between its open and closed positions, presents a complex form, provided in particular with a radius of curvature downstream from said shutter in its opening zone.

As a rule, butterfly valves are made of metal and for example of molded aluminum. The housings made in this way generally undergo machining to adjust the internal dimensions according to the shutter. In the case described, for example, in the publication EP-A-109 792 where the housing of the butterfly valve comprises two opposing recesses arranged in the butterfly shutter's opening zones to allow the progressive flow of air when opening. These recesses are achieved by machining, which implies a high cost. Furthermore, for each type of engine, there is a corresponding type of valve with a housing provided with a specific active inner surface according to the variation in the air flow rate required to achieve optimum engine running conditions. It is therefore necessary to provide as many molds for manufacturing housings as types of valves.

It is a well known fact that industrialists are constantly seeking to reduce raw material, manufacturing, assembly and storage costs, as well as reduce the weight of the parts. As a result, some manufacturers have made butterfly valve housings out of molded synthetic material. Two of these embodiments are described in publications FR-A-2 674 573 and FR-A-2 694 963. Nevertheless, the butterfly valves obtained do not make it possible to ensure time-constant air flow rates. Indeed, the material used is generally thermoplastic which is sensitive to variations in humidity and variations in the ambient temperature as well as that of the fluid being conveyed. The result of this is substantial variations in the internal dimensions of the housing, and consequently, the air flow rate for a given position of the shutter. These variations in air flow rate have an effect on the carburation and generate increased pollution from the exhaust gas.

Other butterfly valves are manufactured according to the so-called dual injection process using various materials as described in the publication FR-A-2 687 601 where the body of the valve is molded first, followed by the butterfly shutter. The shutter thus presents absolutely the same form as the body. When operating, there is therefore a risk of the shutter getting stuck in the body caused, in particular, by the shrinkage which is bound to be different due to the fact that the parts do not have the same external shapes and due to variations in humidity and temperature which generate dimensional variations. This manufacturing method does not make it possible to adapt the external shape of the shutter with the internal shape of the body. What is more, the shutter comprises two disks designed to guide it in rotation in said body. This system is totally inefficient throughout time. In the publication EP-A-482 272, the body also serves as a cavity for the shutter. Its form will therefore depend on that of the body without there being any possibility of adapting it. It is not possible to provide a relief on the shutter's external surface to avoid jamming. Furthermore, a Z-shaped shutter generates quite considerable ventilation pressure losses.

Another embodiment of butterfly valve is disclosed in the publication EP-A-0 023 133, this valve being equipped with a ring-shaped insert provided in the conduit and inserted between the housing and shutter. This ring is metallic, presents a basic annular shape and is encompassed by the duplicated molded housing in thermoplastic material. The purpose of this valve is to ensure complete tightness when the shutter closes by means of various seals provided on either side of the ring, between the ring and the housing and between the ring and the butterfly shutter's shaft. An additional metal sleeve is also provided inside the housing on either side of the ring. This embodiment is consequently very complex and costly, taking into account the large number of parts which have to be assembled before duplicate molding the housing and it can only fit one type of engine. Furthermore, complete tightness is generally prohibited in the planned application to avoid the risks of jamming the shutter.

Other embodiments exist with reference to the publication WO-A-96 07041 which describes a butterfly valve comprised of a body made up of two parts, a ring forming a seat and a butterfly shutter. The various parts are manufactured individually and then assembled, which entails a high manufacturing and assembling cost and requires more space. What is more, it is vital that absolute tightness be achieved between the various parts (both parts of the body and the ring) thereby generating an extra cost. In the event of the butterfly housing being arranged at the end of the distributor, it is subjected to considerable accelerations and vibrations and it therefore has to be very rigid to ensure good mechanical behavior. It is difficult to achieve this rigidity if the housing is comprised of several parts. Some of these drawbacks can be found in the valve dealt with in the publication DE-A-196 15 438, the housing of which is comprised of two parts, the ring and the shutter being obtained by means of a dual injection process. The most critical point is the risk of jamming the shutter in the housing, given the fact that the shutter moves through a position perpendicular to said housing's shaft. What is more, the inside ring presents two shoulders which bring about ventilation pressure losses when fully open and thus penalize the filling of the engine's combustion cylinders.

The object of the present invention is to overcome the above-mentioned drawbacks by proposing an extremely simple butterfly valve comprising the minimum number of parts, which can be produced at low cost, whilst being light and able to suit various types of engines, this valve being designed to be stable from a dimensional point of view, insensitive to variations in humidity and temperature, in order to ensure a constant and highly accurate air flow rate throughout time, even in the closed position.

SUMMARY OF THE INVENTION

This objective is achieved by a butterfly valve as disclosed in the preamble and characterized in that it comprises a ring which is coaxial to the conduit and inserted between the housing and the butterfly shutter, this ring being provided with a transversal guide bore designed to receive the shutter's control shaft and comprising an active inner surface forming a seat for said butterfly shutter in the closed position, the ring being made of a material presenting a good dimensional stability and the housing being molded around said ring in a synthetic material which withstands the technical constraints imposed on it and in that said ring is arranged in such a way that when the shutter is in the closed position, there remains a set clearance between the ring's active inner surface and the butterfly shutter designed to allow a minimum fluid flow rate which is time-constant, regardless of the variations in humidity and temperature.

In a preferred form of embodiment of the invention, the housing presents a standard shape for several types of engines and the ring and the shutter present a shape which is adapted to each type of engine. The technical nature of the valve is thereby centralized on the ring with the housing only having the function of supporting and incorporating the surrounding parts.

Taking into consideration the ring's functional and dimensional constraints, the ring is made of a material which is chosen from among metals, metal alloys, thermosetting or thermoplastic synthetic materials, aluminum being included in the metals.

The housing, having to ensure the whole set's good mechanical behavior and remain insensitive to vibrations and shocks, is made of a material chosen from the thermoplastic synthetic materials.

The butterfly shutter, also having to meet the dimensional constraints, is made of a material which is chosen from among metals, metal alloys or thermosetting synthetic materials, aluminum being included in the metals. Nevertheless, some butterfly shutters can be made of a thermoplastic synthetic material if the constraints are less harsh.

The ring's active inner surface can present a substantially cylindrical basic form or a complex form provided with at least one partially spherical zone provided at least downstream in the shutter's opening direction, this zone being designed to allow a progressive flow of fluid to pass through at least when the shutter starts to open. The ring extends advantageously inside the housing perpendicular to the conduit's shaft, the bore for guiding the shutter's control shaft being provided in this extension, the contact surface between the housing and the ring forming a tightness zone and the contact surface between the ring and the shaft also forming a tightness zone.

In an alternative embodiment, the ring can comprise at both its ends, away from its active inner surface, at least one thinner internal peripheral zone designed to be deformed when the housing is duplicate molded. The ring can thus comprise at both its ends a ring-shaped groove delimiting an outer ring-shaped lip and an inner ring-shaped lip, the latter forming said thinner zone.

The housing can be added to an air distributor by welding it or it can be advantageously incorporated into an air distributor by molding in one single piece.

The invention also relates to a method for manufacturing a valve such as the one defined above, characterized in that a ring is made of a material presenting a good dimensional stability, this ring is placed in a mold, a housing is molded around this ring in a synthetic material which withstands the technical constraints imposed.

In a form of embodiment, a ring is molded in a cavity, around at least one spindle, the outer form of which matches the form of the ring's active inner surface and then the housing is molded around the ring and around said spindle, the outside diameter of which matches the conduit's diameter.

A plurality of spindles of various forms can be provided, so as to vary the form of the ring's active inner surface. In this way, it is very easy to adapt the form of this inner surface according to the type of engine.

It is possible to machine the ring's active inner surface after molding the housing to adjust its dimensions and its internal forms according to the shutter, before mounting the latter in the housing by means of its control shaft crossing and guided in the corresponding bore provided in the ring.

According to another method of manufacturing a valve according to the invention, the following operations are carried out in this order:

the shaft is placed in a first mold, the ring is molded around the shaft in a material presenting a good dimensional stability, the "shaft-ring" set is placed in a second mold, and the housing and shutter are duplicated molded simultaneously around said set in materials withstanding the technical constraints imposed. As regards the housing and shutter, identical or various materials can be chosen according to the requirements.

Roughnesses are provided advantageously on the shaft forming a catching zone to maintain said duplicate molded shutter.

Preferably, the housing is duplicate molded according to a standard form adapted to several types of engines and the ring is molded according to a form adapted to each type of engine.

In one of the alternative embodiments, the air distributor is molded with the housing all in one piece and in one operation.

Advantageously, the housing's material is chemically compatible with that of the ring so that they stick to each other and ensure tightness between the ring and the housing.

BRIEF DESCRIPTION OF THE DRAWING(S)

The present invention and its advantages shall be more clearly understood in the following description of examples of embodiment, with reference to the accompanying drawings, in which:

FIG. 1 is a longitudinal cutaway view of a first form of embodiment of the butterfly valve according to the invention, going through the butterfly shutter's shaft, FIG. 2 is a longitudinal cutaway view of a second form of embodiment of the invention, perpendicular to the butterfly shutter's shaft, FIG. 3 is an exploded view and perspective of the shutter and its control shaft, FIG. 4 is a simplified longitudinal cutaway view of a butterfly valve added to a distributor, FIG. 5 is a simplified longitudinal cutaway view of a butterfly valve incorporated into a distributor, FIG. 6 represents an example of a method for manufacturing the valve according to the invention.

FIGS. 7A and 7B represent, in a longitudinal cutaway view, another form of embodiment of the invention achieved according to the manufacturing method, and FIGS. 8A and 8B represent, in a longitudinal cutaway view, yet another form of embodiment of the invention,

DESCRIPTION OF THE PREFERRED EMBODIMENT(S)

The butterfly valve according to the invention is generally used on the inlet side of an air distributor in a fuel injection device for an internal combustion engine.

Nevertheless, this valve can be used in any other device to control the flow rate of a liquid or gaseous fluid.

Figure 1:
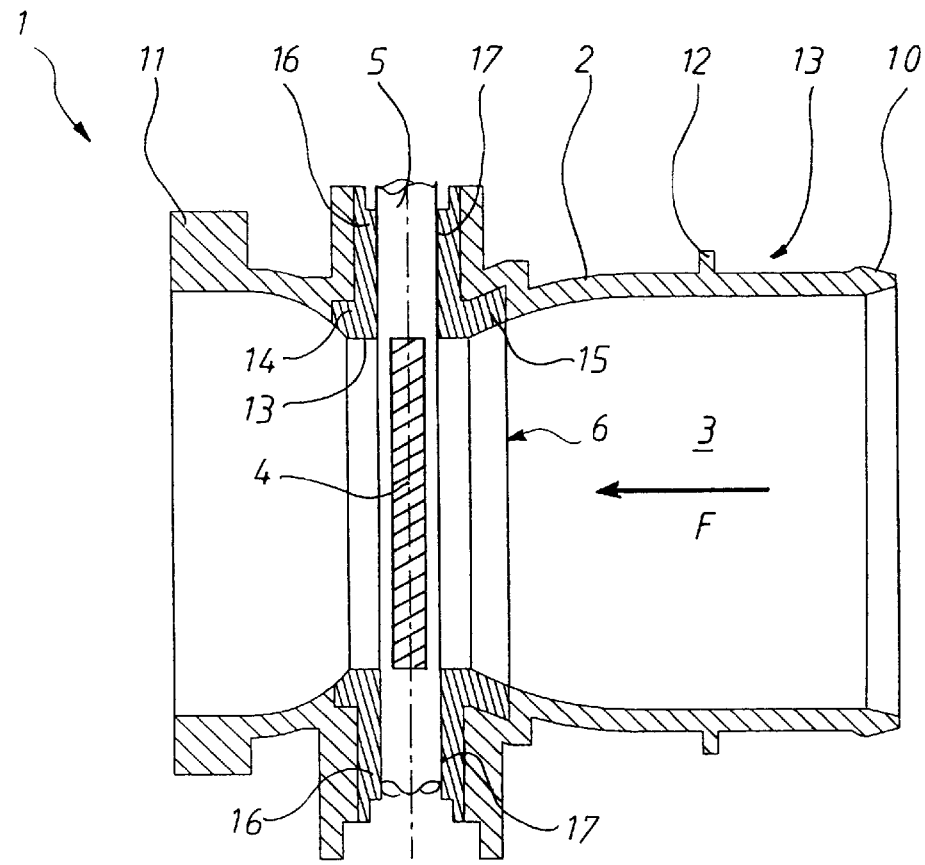
Figure 3:
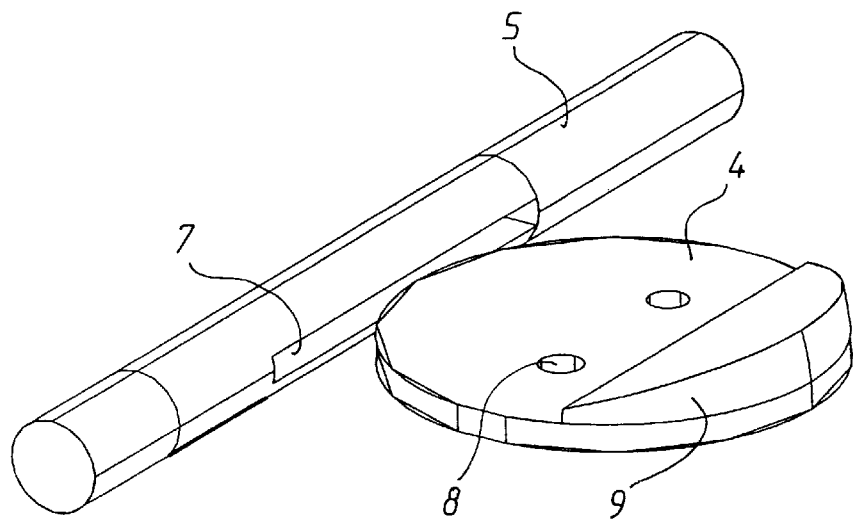
Figure 2:
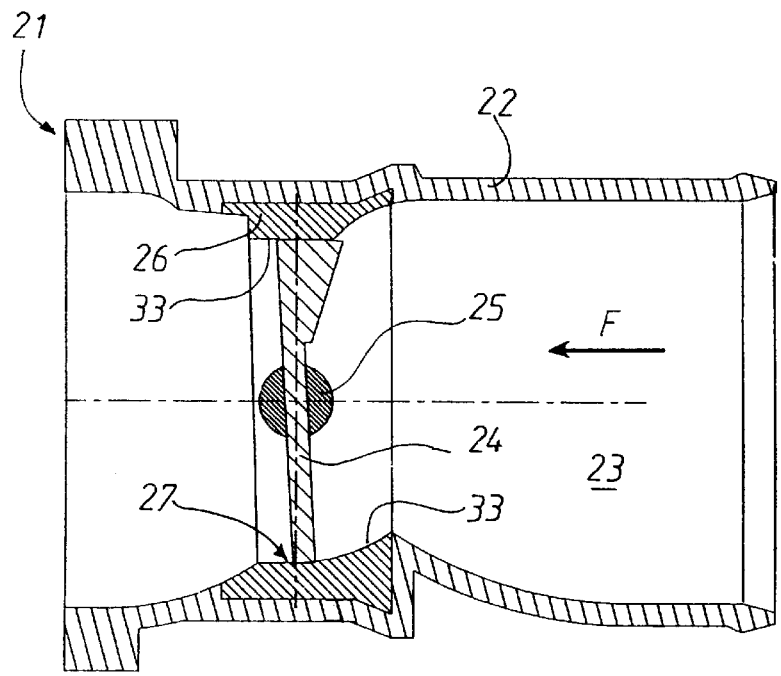

With reference to FIGS. 1 to 3, this butterfly valve 1 comprises a housing 2 in which is arranged a conduit 3 for the fluid to circulate in the direction of the arrow F, a rotating butterfly shutter 4, mounted on a control shaft 5, at right angles to the conduit 3 and a ring 6 provided between the housing 2, the butterfly shutter 4 and its control shaft 5. The butterfly shutter 4 is movable between a position in which the conduit 3 is closed and the butterfly shutter is substantially oriented perpendicular to this conduit's shaft and a position in which the conduit 3 is fully open and the butterfly shutter is substantially oriented parallel to this conduit's shaft. This butterfly valve 1 is designed to ensure a time-constant air flow rate, regardless of the variations in humidity and temperature, so as to ensure that the engine runs smoothly in order to meet the anti-pollution standards in force (EURO 2000). This requirement means that the external dimensions of the shutter 4 and the internal dimensions of the ring 6 have to be perfectly controlled and these dimensions have to remain stable throughout time.

Consequently, the butterfly valve 4 is made of a material which has stable dimensions. This material can be a metal, like aluminum, a metal alloy or a thermosetting synthetic material or even a thermoplastic one in some cases. The shutter is generally disk-shaped. According to a first manufacturing method, this shutter is mounted in a crossing seat 7 provided in the control shaft 5, after this shaft 5 has been assembled in the housing 2. It is then fixed by means of screws or any other fixing means through holes 8 provided in the shutter 4. This shutter 4 may present a thicker zone 9 having an inclined plane in the direction of the control shaft 5. This thicker zone 9 is located on the surface of the shutter 4 communicating with the fluid and on the plane of this shutter which moves against the flow of fluid when said shutter is opened. Its purpose is to achieve a progressive fluid flow rate and direct said fluid to the opening zone. Of course, the forms of the butterfly shutter 4 may vary according to the mechanical constraints, the type of fluid, the engine's power, etc.

The housing 2, which is only used to support and incorporate the surrounding parts, is made of a molded synthetic material which withstands the technical constraints imposed by specifications, in particular shocks, vibrations and high temperatures. This material is preferably a thermoplastic one, such as polyetherimide (PEI) or a polyamide (PA), with glass fiber for example. This type of material offers considerable advantages, particularly in terms of the cost price, weight, ease with which it can be incorporated into the other parts, the possibility and ease with which different types of assembly can be allowed by ultrasonic welding, thermal welding, or with a heating tag, by vibration, by clipping, and a multitude of finishing possibilities. The housing 2 is generally tubular and it has two open ends, the first 10 of which is designed to be assembled to an air duct coming from the air filter or directly to the air filter, and the second one 11 to an air distributor. The first end 10 is slightly flared to shrink onto the air duct or onto the air filter and it has an outer bulb 12 which delimits a place 13 for a clamping collar. The second end 11 comprises a flange designed to receive a joint or to be welded onto the body of the distributor. Given its function, this housing 2 can be designed to adapt to several types of engines and therefore become a standard part able to be made in a single mold.

As disclosed above, the ring 6 plays a fundamental role and constitutes the valve's essential and functional component. For this purpose, it has to be made of a dimensionally stable material which is insensitive to variations in temperature and humidity. This material can be a metal, like aluminum, a metal alloy or a thermosetting or thermoplastic synthetic material. This ring 6 presents an active inner surface 13 forming a seat for said butterfly shutter 4, and which is substantially cylinder-shaped. In the example of embodiment shown, this active inner surface 13 defines a diameter which is smaller than the diameter of the conduit 3 and extends on either side of a peripheral edge 14, 15 flared to connect the active inner surface 13 to the conduit. The ring 6 also extends inside the housing 2 by at least two protuberances 16 which are diametrical and arranged perpendicular to the conduit's 3 shaft. These protuberances 16 are each crossed by a guide bore 17 designed to receive and guide the control shaft 5 of the butterfly shutter 4. This control shaft is accessible from outside the valve's housing 2 to be coupled to any control device known to the expert. The shape of the ring 6 and especially the geometry of its active inner surface 13 is defined according to the engine. In the example shown, the active inner surface presents a basic cylindrical form but we shall see later that it can be more complex. The sizing of this ring 6 will make it possible to adjust the air flow rate to obtain an optimum carburation for each type of engine. Furthermore, when the butterfly shutter 4 is in the closed position, the active inner surface 13 of the ring 6 is sized so that a given clearance persists to allow a minimum and constant air flow rate. We can now understand why it is necessary to choose dimensionally stable material to make the ring 6 and the shutter 4. Indeed, the clearance between these two parts 4, 6 can be fully controlled, whilst achieving great accuracy and an excellent constancy of the air flow rate. For example, in the closed position, the clearance allows an air flow of 2.5 kg/hr to pass with an accuracy of + or −0.2 kg/hr. It is worth mentioning here that the quality of the combustion and that of the exhaust gas are closely linked to the air/fuel mix in the engine's cylinders. Any ill-timed variation in the air flow impairs this combustion and leads to increased pollution.

In order to produce the butterfly valve as shown in FIGS. 1 and 3, according to a first manufacturing method, the butterfly shutter 4 and its control shaft 5 are manufactured separately in a material chosen according to the mechanical and dimensional constraints. The ring 6 is also manufactured separately, either by machining or by molding depending on the material chosen. The ring 6 is then inserted in the mold designed to manufacture the housing 2 and this housing 2 is duplicate molded around the ring 6. The peripheral edges 14, 15 of the ring 6 provide a resistance against the injection pressure to prevent this ring from collapsing. The housing 2 fully encompasses the ring 6. The respective materials are also chosen to ensure cohesion between them so as to create a perfect tightness zone between the ring 6 and the housing 2. This manufacturing trick avoids having to add specific seals. The housing 2 molded in this way, fitted with its ring 6, is completed with the control shaft 5 and the corresponding butterfly shutter 4. The diameter of the guide bore 17 provided in the ring 6 corresponds to the diameter of the control shaft 5, with no clearance to ensure tightness between these two parts. Before mounting the butterfly shutter 4, it is however possible to machine the active inner surface 13 of the ring 6 after molding, with the aim of accurately adjusting its internal dimensions and forms.

Figure 8A:
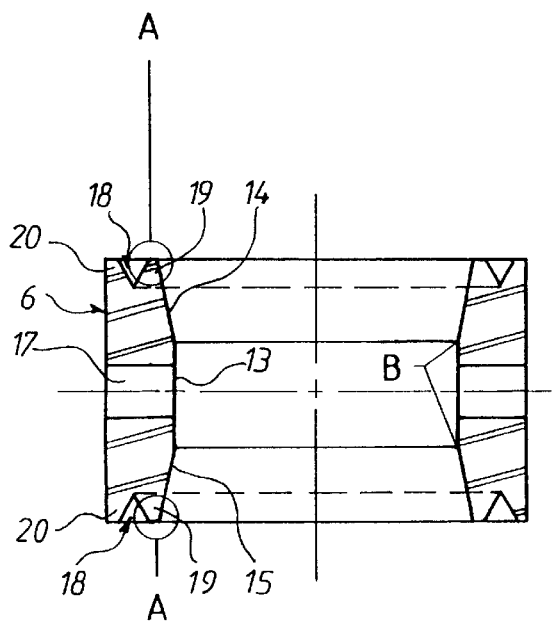
Figure 8B:
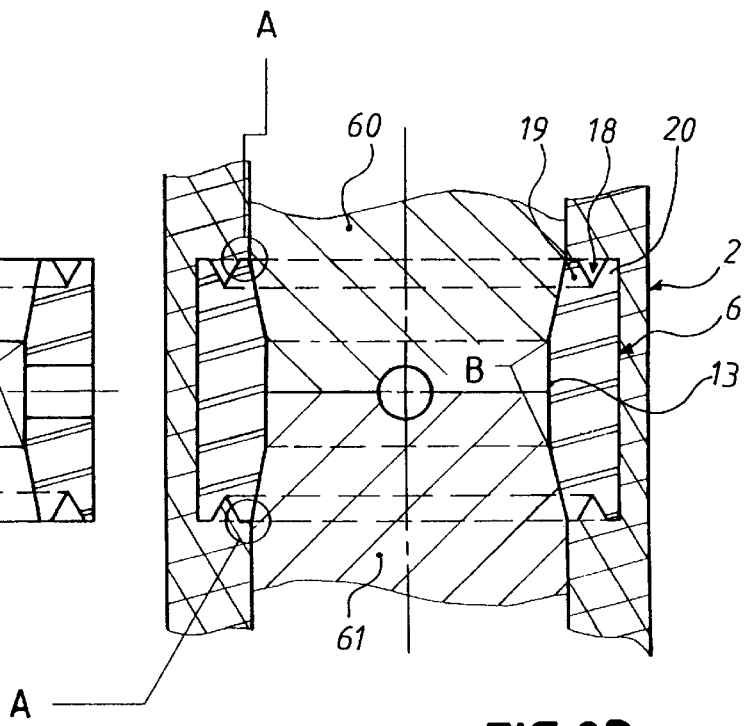

FIGS. 8A and 8B show an alternative embodiment of the ring 6. Once again, on this ring 6, there is the active inner surface 13, the two peripheral flared edges 14, 15 and the two guide bores 17. In addition, it comprises (cf. FIG. 8A) at both its ends, an annular V-shaped groove 18 delimiting two ring-shaped lips 19, 20, i.e. an inner lip 19 and an outer lip 20. This groove 18 is formed when molding or machining the ring 6 made for example of aluminum or any other previously mentioned dimensionally stable material. The inner lips 19 create a ring-shaped privileged deformation zone A when the housing is duplicate molded 2. Indeed and with reference to FIG. 8B, the lips 19 of the ring 6 conform by a deformation of the zones A on the duplicate mold bearings of the pins 60, 61, thereby generating sufficient tightness to prevent plastic from infiltrating inside the ring 6. The fineness and the great ductility of the lips 19 in relation to the functional zones, marked B, corresponding to the edges delimiting the active inner surface 13, allowing the latter to not become deformed during the duplicate molding. The deformation of the zones A does not affect the functional zones B. This duplicate molding technique by privileged deformation therefore makes it possible to establish perfect tightness on the ring 6, made for example of roughed foundry or machined aluminum, therefore with an approximate accuracy, without deforming its functional zones.

FIG. 2 shows an alternative embodiment of a butterfly valve 1 according to the invention in which there is a housing crossed by a conduit 23, a butterfly shutter 24 with its control shaft 25 and a ring 26 whose active inner surface 33 presents a more complex form than the one in the previous example. Indeed, the active inner surface 33 of the ring 26 has a substantially cylindrical form 27 in the shutter's 24 opening zone. This form offers the advantage of releasing the air progressively when the shutter 24 starts to open, thus generating a progressive air flow.

Figure 4:
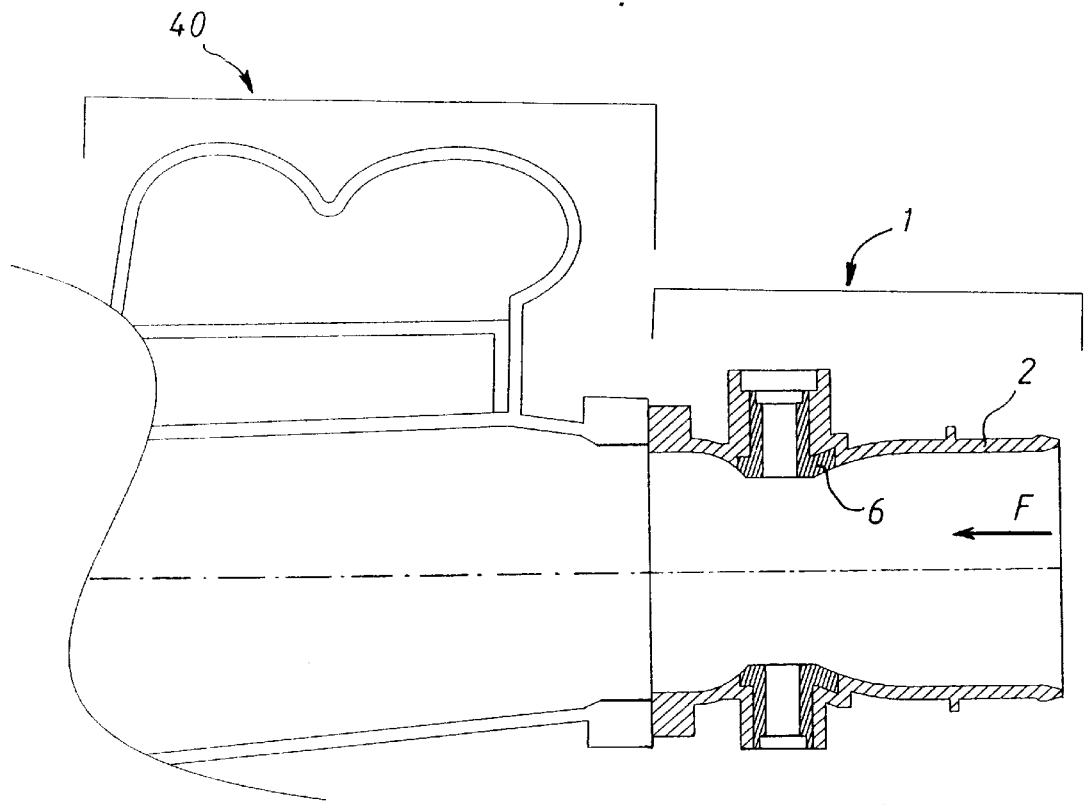
Figure 5:
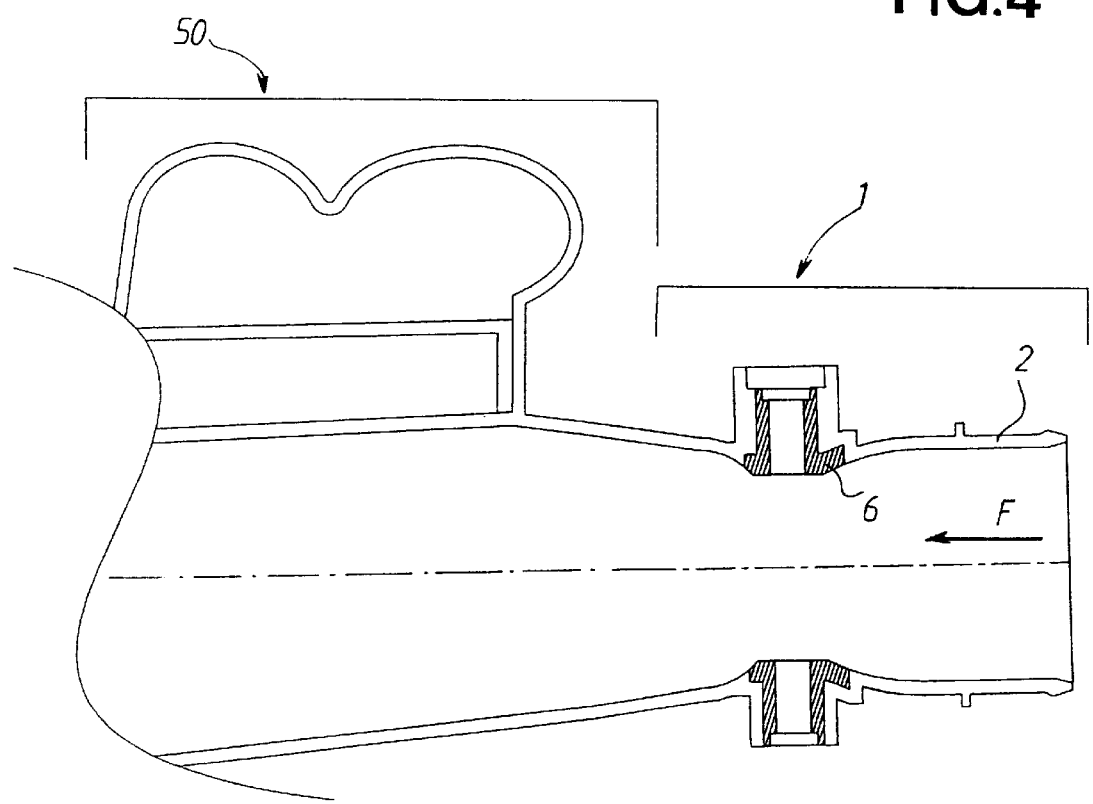

FIGS. 4 and 5 show two alternatives for assembling the butterfly valve 1 with a distributor 40, 50. In FIG. 4, the valve 1 constitutes a distinct part which is added onto the distributor 40, for example by welding it. In FIG. 5, the valve 1 forms an integral part of the distributor 50, the housing 2 of the valve 1 being molded in one single piece with the body of said distributor 50. In this embodiment, the ring 6 is placed directly in the distributor's 50 mold.

Figure 6:
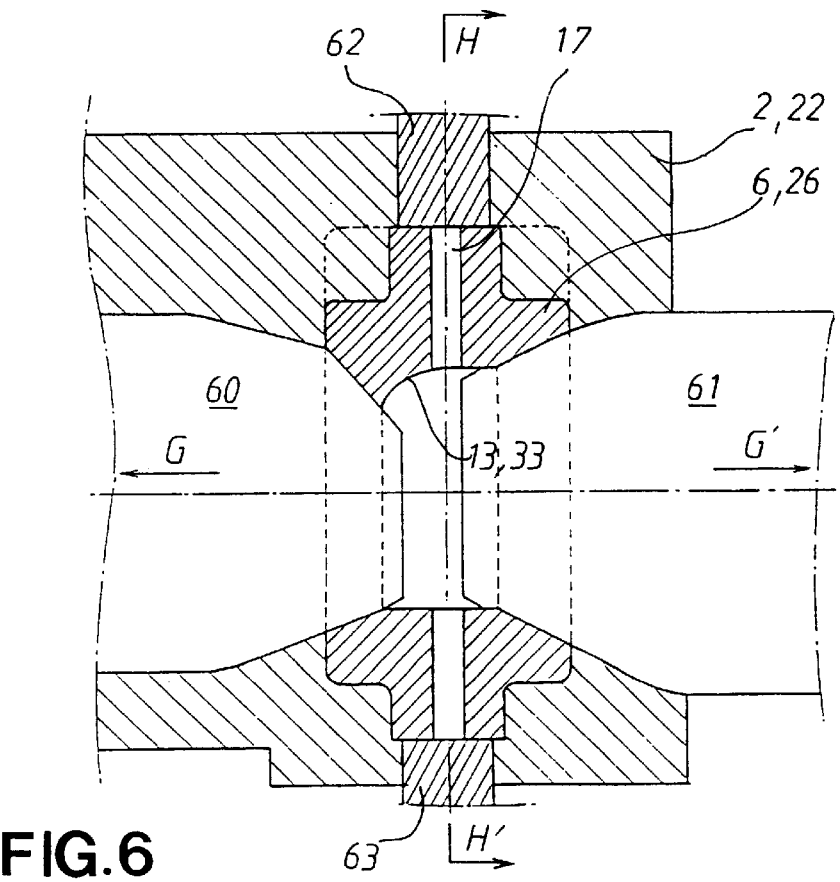

FIG. 6 illustrates an example of embodiment of a housing 2 of a butterfly valve 1 according to a second manufacturing method, in which the housing 2 is duplicate molded around a previously molded ring 6, and around two pins 60, 61 which define the internal forms of this housing. The end of the pins 60, 61 matches the internal volumes of the ring 6, which has been previously molded around appropriate pins. The tooling for duplicate molding this housing 2 comprises two drawers 62, 63 located directly in line with the guide bore 17 arranged in the ring 6. They are designed to create the recesses required for the butterfly shutter's control shaft to pass through. When the molding operation is finished, the pins 60, 61 and the drawers 62, 63 withdraw in the direction of the arrows G, G', H, H' and the housing 2 fitted with its ring 6 can be removed from the mold.

Figure 7A:
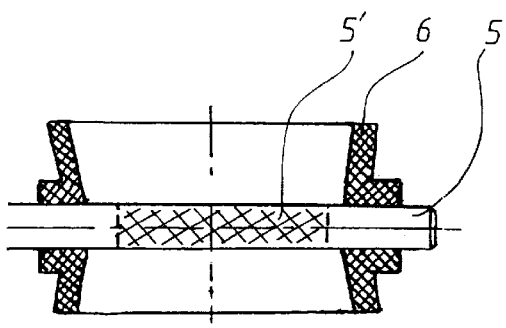
Figure 7B:
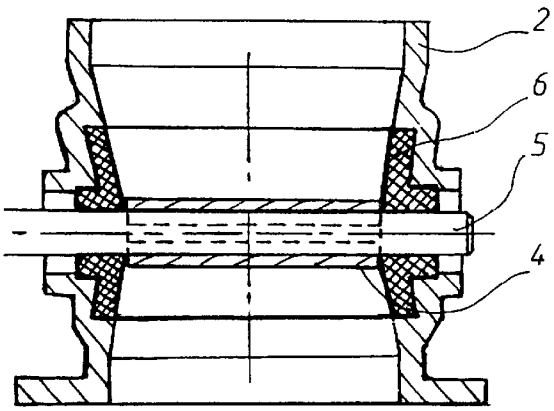

FIGS. 7A and 7B show an alternative embodiment of the valve 1 according to a third manufacturing method. In a first manufacturing phase, the shutter's 4 control shaft 5 is put in place in a mold to mold the ring 6 around the shaft 5. The "shaft-ring" set 5, 6 obtained in this way is shown by FIG. 7A. On this shaft 5, at least one catching zone 5= is provided which is designed to receive and hold the shutter 4. This catching zone 5' can be made up of flat faces, scratches, a knurl or any other roughness. In a second manufacturing phase, the "shaft-ring" set 5, 6 is put in place in a mold and the housing 2 and simultaneously the shutter 4 are molded around said "shaft-ring" set 5, 6. The valve shown in FIG. 7B is obtained. The shutter 4 is kept closed on its shaft 5 due to the catching zone 5'. The materials chosen for the various parts are similar to those given in the previous examples.

It will become quite clear that this third manufacturing method makes it possible to offer numerous advantages. This method does away with the time required to mount the shaft 5 in the housing 2 and the tricky and costly operation of assembling the shutter 4 on its shaft by means of screws. As the shutter 4 is duplicate molded at the same time as the housing 2, the overall manufacturing time is reduced. As the shutter 4 is duplicate molded in the ring 6, it perfectly matches the internal form of this ring thereby minimizing any leakage of the fluid between the upstream and downstream side of the shutter 4 and also avoiding any machining to adjust the shutter 4 to the ring 6. This leakage is primarily due to the removal of the shutter after molding. The catching zone 5' provided on the shaft 5 to hold the shutter 4 avoids the tricky operation of machining the shaft 5 to approach and hold the shutter 4. The fact that the ring 6 is molded on the shaft 5 means that the misalignments between the two bearings of the shaft 5 in said ring are done away with. As the housing 2 and the shutter 4 are duplicate molded simultaneously, it is possible to use both identical and different materials suited to the parts' functions. In this final case, it is a question of a twin-material injection.

According to yet another manufacturing method, the following operating phases could be planned:

1. mounting or molding the shutter on its shaft,
2. duplicate molding the ring around the "shutter-shaft" set,
3. duplicate molding the housing around the "shutter-shaft-ring" set, Nevertheless, the method requires an additional molding stage compared with the method described beforehand.

It clearly emerges from this description that the invention makes it possible to achieve the objectives set.

The present invention is not limited to the examples of embodiment described, nor to the various manufacturing methods mentioned, but can be widened to include any modification and alternative which are obvious for an expert. In particular, the butterfly valve forming the subject of this invention, is not limited to the application described but can be extended to any other application requiring the flow of fluid to be controlled or to any type of fluid.

What is claimed is:

1. A butterfly valve (1, 21) for controlling the flow of a fluid, in particular the air flow rate entering an air distributor provided in a fuel injection device for an internal combustion engine, said valve comprising a housing (2, 22) made of a molded synthetic material, a conduit (3, 23) arranged in said housing for through fluid flow, a control shaft (5, 25) guided in the housing, a butterfly shutter (4, 24) located at right angles to the conduit and mounted on said control shaft, the butterfly shutter (4, 24) designed to move between a position in which the conduit is closed and the butterfly shutter is oriented substantially perpendicular to the conduit and a position in which the conduit is fully open and the butterfly shutter is oriented substantially parallel to said conduit, wherein the butterfly valve is comprised of a ring (6, 26) with an upstream end and a downstream end coaxial to the conduit (3, 23), the ring inserted between the housing (2, 22) and the butterfly shutter (4, 24), the ring provided with a transverse guide bore (17) designed to receive the shutter's control shaft (5, 25), and comprising an active inner surface (13, 33) forming a seat for said butterfly shutter (4, 24) in the shutter closed position, the ring (6, 26) made of a dimensionally stable preselected material, and the housing (2, 22) of a preselected material molded around said ring, said ring (6, 26) arranged to provide, when the shutter (4, 24) is closed, a set clearance between the ring (6, 26) active inner surface (13, 33) and the butterfly shutter (4, 24), said clearance permitting a minimum fluid flow rate which is time-constant regardless of variations in humidity or temperature.

2. The valve according to claim 1, wherein the housing (2, 22) functions with air distributors of several types of engines and the ring (6, 26) and the shutter (4, 24) are adapted for each type of engine.

3. The valve according to claim 2, wherein the ring (6, 26) and the shutter (4, 24) are made of a material which is selected from the group consisting of metals, metal alloys, thermosetting and thermoplastic synthetic materials.

4. The valve according to claim 2, wherein the housing (2, 22) is made of a material chosen from the thermoplastic synthetic materials.

5. The valve according to claim 2, wherein the ring's active inner surface (13) presents a substantially cylindrical basic form.

6. The valve according to claim 1, wherein the ring's active inner surface (33) presents a complex form provided with at least one partially spherical zone (27) provided at the ring downstream end in the shutter's (24) opening direction, said zone being designed to allow a progressive flow of fluid to pass through at least when the shutter starts to open.

7. The valve according to claim 1, wherein the ring (6, 26) extends inside the housing (2, 22) perpendicular to the conduit (3, 23) shaft, the guide bore (17) being provided in an extension (16), a contact surface between the housing (2, 22) and the ring (6, 26) forming a tightness zone, and a contact surface between the ring (6, 26) and the shaft (5, 25) also forming a tightness zone.

8. The valve according to claim 1, wherein the ring (6, 26) comprises at both upstream and downstream ends, away from its active inner surface (13, 33), at least one thinner internal peripheral zone (A) designed to be deformed when the housing (2) is duplicate molded.

9. The valve according to claim 8, wherein the ring (6, 26) comprises at both upstream and downstream ends a ring-shaped groove (18) delimiting an outer ring-shaped lip (20) and an inner ring-shaped lip (19), the inner ring-shaped lip forming said thinner zone (A).

10. The valve according to claim 1, wherein the housing (2) is added onto an air distributor (40).

11. The valve according to claim 1, wherein the housing (2) is incorporated into an air distributor (50).

12. The method of manufacturing a butterfly valve which comprises the steps of:
forming a ring of pre-selected material and internal geometry sized to suit a specific butterfly valve application;
inserting said ring into a mold;
molding a butterfly valve housing from synthetic material incorporating said ring and forming a conduit shaped for fluid passage through said housing;
selecting a pre-manufactured butterfly shutter sized to permit fluid flow around said shutter and within said ring geometry;
inserting said shutter into said molded housing; and
mounting rotatably said shutter into said molded housing with conduit;
wherein said shutter is oriented substantially perpendicular to said conduit in a valve closed position and said shutter is oriented substantially parallel to said conduit in a valve open position.

13. The method of manufacturing a butterfly valve of claim 12 further comprising the steps of:
inserting at least one spindle with one end of selected outer form and a second end dimensionally matching said ring inner surface, with said second end adjacent to said ring;
molding said housing incorporating said at least one spindle form within said conduit.

14. The method of manufacturing a butterfly valve of claim 12 further comprising the steps of:
manufacturing a plurality of said spindle shapes;
molding said housing applying said plurality of spindle shapes;
wherein said ring geometry and said conduit shape are varied to suit specific butterfly valve applications.

15. The method of manufacturing a butterfly valve of claim 14 further comprises the steps of:
providing a bore in said ring of a selected internal diameter;
providing a control shaft with said control shaft diameter corresponding to said bore internal diameter;
mounting fixedly said shutter on said control shaft;
mounting rotatably said control shaft within said ring bore.

16. The method of manufacturing a butterfly valve according to claim 12 further comprising the steps in the order of:
placing the shaft in a first mold, with the ring;
molding the ring around the shaft creating a shaft-ring set;
placing said shaft-ring set in a second mold;
molding said shaft-ring set within said housing and said shutter.

17. The method of manufacturing a butterfly valve according to claim 16 further comprising the steps of:
providing roughness on said shaft;
forming a catching zone at said roughness;
mounting said shutter on said catching zone.

18. The method of manufacturing a butterfly valve according to claim 12 further comprising steps of:
adapting the geometry of said ring according to a form specific to automobile air distributor fuel injection devices for internal combustion engines.

19. The method of manufacturing a butterfly valve according to claim 18 further comprising the steps of:
molding said butterfly housing and a automobile air distributor in one piece, in one operation.

20. The method of manufacturing a butterfly valve according to claim 12 further comprising the steps of:
molding said housing of a material chemically compatible with said ring;
wherein said housing and said ring adhere to each other ensuring a tight bond between the housing and the ring.

* * * * *